United States Patent
Price et al.

(10) Patent No.: US 11,781,060 B2
(45) Date of Patent: Oct. 10, 2023

(54) ULTRA HIGH ACTIVITY SLURRY FOR HYDRAULIC FRACTURING

(71) Applicant: SELECT CHEMISTRY, LLC, Houston, TX (US)

(72) Inventors: Brian Price, Conroe, TX (US); Fatee Malekahmadi, Houston, TX (US); Yifan Li, Katy, TX (US)

(73) Assignee: SELECT CHEMISTRY, LLC, Houston, TX (US)

( * ) Notice: Subject to any disclaimer, the term of this patent is extended or adjusted under 35 U.S.C. 154(b) by 0 days.

(21) Appl. No.: 17/094,304

(22) Filed: Nov. 10, 2020

(65) Prior Publication Data

US 2021/0155847 A1 May 27, 2021

Related U.S. Application Data

(60) Provisional application No. 62/938,624, filed on Nov. 21, 2019.

(51) Int. Cl.
*C09K 8/68* (2006.01)
*C09K 8/60* (2006.01)

(52) U.S. Cl.
CPC ............... *C09K 8/68* (2013.01); *C09K 8/604* (2013.01)

(58) Field of Classification Search
CPC .......... C09K 8/68; C09K 8/604; C09K 8/035; C09K 8/64; C09K 8/82
See application file for complete search history.

(56) References Cited

U.S. PATENT DOCUMENTS

| | | | | |
|---|---|---|---|---|
| 4,435,217 A | * | 3/1984 | House | C08J 3/11 106/181.1 |
| 6,060,434 A | * | 5/2000 | Sweatman | C09K 8/50 507/216 |
| 2017/0313930 A1 | * | 11/2017 | Patel | C09K 8/80 |

* cited by examiner

*Primary Examiner* — Aiqun Li
(74) *Attorney, Agent, or Firm* — Ewing & Jones, PLLC

(57) ABSTRACT

An oil-based slurry that includes oil, a suspension package, a dispersion agent, a surfactant, and a dry water-soluble polymer.

4 Claims, 7 Drawing Sheets

Polyacrylamide Slurry Formula

Formula 1

ULTRA HIGH ACTIVITY SLURRY FOR HYDRAULIC FRACTURING

CROSS-REFERENCE TO RELATED APPLICATIONS

This application is a nonprovisional application which claims priority from U.S. provisional application No. 62/938,624, filed Nov. 21, 2019, which is incorporated by reference herein in its entirety.

FIELD

Embodiments of the present disclosure generally relate to the formation of slickwater fracturing fluids.

BACKGROUND

During hydraulic fracturing, perforations in the casing of a wellbore are formed at targeted zones of the subterranean formation prior to the introduction of a fracturing fluid. The fracturing fluid is pumped through a section of the wellbore. The hydraulic pressure from the fracturing fluid results in a network of fractures in the subterranean formation. Further pumping of fracturing fluid causes the network of fractures to continue to propagate through the subterranean formation. Proppant, typically sand, is then added to the fluid. The proppant is suspended within the fracturing fluid and is carried to the fractures in the subterranean formation so as to keep the fractures open. Once the hydraulic pressure of the fracturing fluid is relieved, the fracture collapses on the proppant within the fracture. The fractures then allow a pathway for the oil, gas and produced water to flow to the surface for recovery and processing.

Synthetic polymer slickwater fluids, which traditionally includes polyacrylamide, polyacrylate, polyacrylate derivatives, poly2-acrylamido-2-methylpropane sulfonic acid and its salt form, polyethylene oxide, polypropylene oxide, or copolymers thereof; synthetic polymer slickwater-crosslinked fluids, which traditionally include polyacrylamide and its derivative crosslinked or polyacrylate and its derivatives crosslinked; or fluids using natural polymer and its derivatives fracturing fluids such as guar gum, guar gum plus crosslinker, guar derivative, guar derivative crosslinked, cellulose, cellulose derivative, or cellulose and its derivative crosslinked are conventionally used as fluid systems for hydraulic fracturing application.

Synthetic polymer slickwater fluids may displace proppant into fractures, increase the fracture width, and carry the proppant to longer latitude while still maintaining the fracturing fluids pump rate at faster rate than the natural polymer systems. There are multiple forms of synthetic polymer available for making slickwater fracturing fluids: dry powder, water-in-oil emulsion, water suspension, and conventional oil-based slurry. There are advantages and disadvantages for each such synthetic polymer form:

TABLE 1

| Polymer Forms | Pros | Cons |
| --- | --- | --- |
| Dry Powder | Low chemical cost per active lb polymer | Hydroscopic, Caking, Blockage in transport lines, Special dry add equipment and operation investment, Hazardous powder dust, Potential long down time |
| Water-in-oil Emulsion | Easy to handle, Less operation issues, No special pumping equipment needed | High chemical cost per active lb polymer, Medium to low polymer activity, High logistic cost, Long reaction process, Capital investment on reaction equipment |
| Water Suspension | No special pumping equipment needed, Less process equipment | High chemical cost per active lb polymer, Lowest polymer activity, High logistic cost, Unintended hydration, Blockage in transport lines, Low polymer activity |
| Conventional Oil-based Slurry | No special pumping equipment or personnel needed, Medium to high activity per active lb polymer, Less process equipment, Easy to handle, less operation issues | Higher polymer activity than emulsion and water suspension, but still lower than dry, high consumption of oil |

Conventional oil-based slurry offers an alternative to the issues associated with dry powder, water-in-oil emulsion, and water suspension, but the manufacturing, logistic, handling, and application cost are not optimal.

SUMMARY

The present disclosure provides for an oil-based slurry that includes oil, a suspension package, a dispersion agent, a surfactant, and a dry water-soluble polymer.

BRIEF DESCRIPTION OF DRAWINGS

The present disclosure may be understood from the following detailed description when read with the accompanying figures. It is emphasized that, in accordance with the standard practice in the industry, various features may not be drawn to scale. In fact, the dimensions of the various features may be arbitrarily increased or reduced for clarity of discussion.

DETAILED DESCRIPTION

Figure 1:
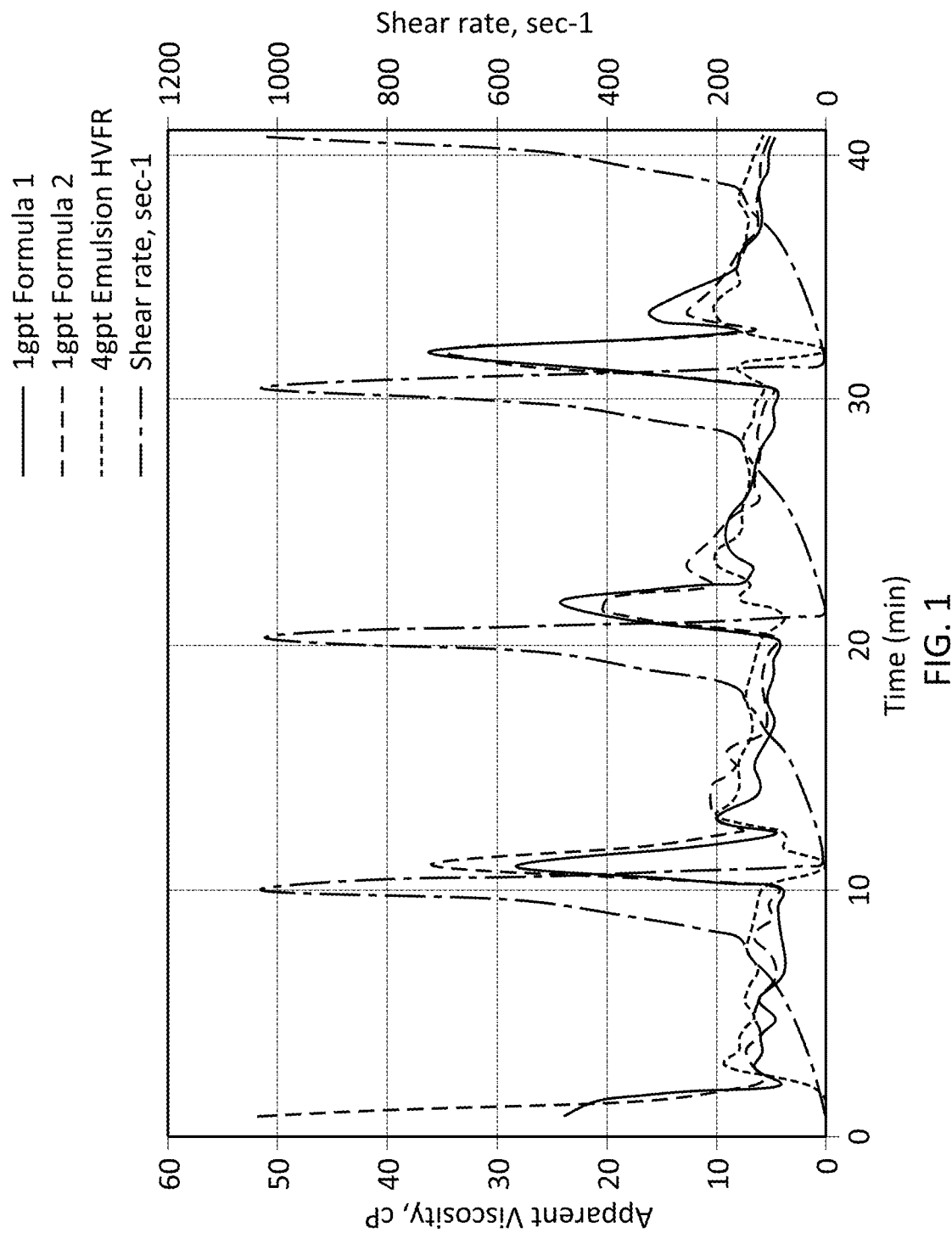
FIG. 1 is a graph depicting a shear ram test of the oil-based slurry of the present disclosure in Permian brackish water as described in Example 4.

A detailed description will now be provided. The following disclosure includes specific embodiments, versions and examples, but the disclosure is not limited to these embodiments, versions or examples, which are included to enable a person having ordinary skill in the art to make and use the disclosure when the information in this application is combined with available information and technology. In addition, the present disclosure may repeat reference numerals and/or letters in the various examples. This repetition is for the purpose of simplicity and clarity and does not in itself dictate a relationship between the various embodiments and/or configurations discussed.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Certain embodiments of the present disclosure are directed to an oil-based slurry that may include oil, a suspension package, a dispersion agent, a surfactant, and dry water-soluble polymer. These oil-based slurries may be used to form synthetic polymer slickwater.

Oil: The oil-based slurry may include between 20% and 45%, between 25% and 40%, or between 30% and 35% oil (by weight of the oil-based slurry) that forms an oil phase. The oil in the oils phase is a gas or liquid hydrocarbon, a petroleum distillate, a methyl ester, or combination thereof.

Suspension package: The suspension package acts to suspend the dry water-soluble polymer in the oil phase. In certain embodiments, the suspension package is an organophilic clay, a linear styrenic block copolymer, or a combination of the organophilic clay and the liner styrenic block copolymer. In certain embodiments, the organophilic clay is a clay mineral where the surfaces have been coated with a chemical to make the clay minerals oil-dispersible. Bentonite and hectorite (plate-like clays) and attapulgite and sepiolite (rod-shaped clays) are examples of such clays. The chemical treatment may include oil-wetting agents, quaternary fatty-acid amines, or combinations thereof. Examples of linear styrenic block copolymers include copolymers made from styrene and ethylene/propylene. The suspension package may be present in the oil-based slurry in an amount from 0.001% to 1%, or from 0.1% to 0.6% (by weight of the oil-based slurry), wherein in certain embodiments, the organophilic clay is present in an amount of from 0.1% to 0.6% (by weight of the slurry) and the styrenic block copolymer is present in an amount of from 0.01% to 0.05% (by weight of the slurry).

Dispersion agent: The dispersion agent can be an anionic, non-ionic, or amphoteric organic compound. The dispersion agent may be present in an amount from 0.01 to 5%, or 0.1% to 5%, or from 0.5% to 3%, or from 1% to 3% (by weight of the oil-based slurry). Non-limiting examples of anionic dispersion agents are C8-C22 fatty acids, polycarboxylic acid and its salts, polycarboxylic copolymer and its slate forms, C8-C22 alkyl sulfates, C8-C22 alkyl benzenesulfonic acid and its salts, or combinations thereof. Non-limiting examples of nonionic dispersants include polyurethane and its derivatives, phosphonate esters, glycerol esters Glycerophospholipid, Phosphatidylethanolamine, and combinations thereof. Non-limiting examples of amphoteric dispersion agents are poly(acrylic acid-co-methacryloxethyltrimethyl ammonium chloride-co-isopentenol polyoxyethylene ether), poly (sodium ally sufonate-co-acrylic acid-co-methacryloxethyltrimethyl ammonium chloride), Phosphatidylcholine and its derivatives, and combinations thereof.

Surfactant: The surfactant may be present in an amount from 0.1% to 1% or from 0.3% to 0.8% or from 0.5% to 0.7% (by weight of the oil-based slurry). Non-limiting examples of the surfactant are C8-C20 linear ethoxylated alcohols, alkoxylated phenolic resins, sorbitan esters, sorbitan ester ethoxylates and combinations thereof.

Dry water-soluble polymer: The dry water-soluble polymer is a synthetic polymer, crosslinked synthetic polymer, natural polymer, crosslinked natural polymer or combinations thereof. The dry water-soluble polymer may be present in an amount from 55% to 70% or from about 60% to 70% or about 65% (by weight of the oil-based slurry). Non-limiting examples of synthetic polymers include polyacrylamide, polyacrylamide derivatives, polyacrylate, polyacrylate derivatives, poly2-acrylamido-2-methylpropane sulfonic acid and its salt form, polydiallyldimethylammonium chloride, poly(dimethylaminoethyl acrylate methyl chloride quat), polyethylene oxide, polypropylene oxide, polyvinyl alcohol, or copolymers thereof, and combinations thereof. Non-limiting examples of cross-linked synthetic polymers include crosslinked polyacrylamide and its derivatives, crosslinked polyacrylate and its derivatives, crosslinked poly(dimethylaminoethyl acrylate methyl chloride quat), crosslinked polyethylene oxide, crosslinked polypropylene oxide, and combinations thereof. Non-limiting examples of natural polymers include guar and its derivatives, cellulose and its derivatives, and combinations thereof. Non-limiting examples of crosslinked natural polymers include crosslinked guar and its derivatives, crosslinked cellulose and its derivatives, and combinations thereof.

In certain embodiments of the present disclosure, the dry water-soluble polymer may have a particle size distribution (PSD) of:

Synthetic Polymer and Crosslinked Synthetic Polymer PSD:
 1-10% 60 mesh or higher
 20-60% 60-120 mesh
 40-70% 120 mesh or lower
Natural Polymer and Crosslinked Natural Polymer PSD:
 1-10% 120 mesh or higher
 20-60% 120-200 mesh
 40-70% 200 mesh or lower The dry water-soluble polymer may have a molecular weight between 1 million and 25 million Daltons, between 5 million and 20 million Daltons, or between 10 million and 20 million Daltons.

Figure 2:
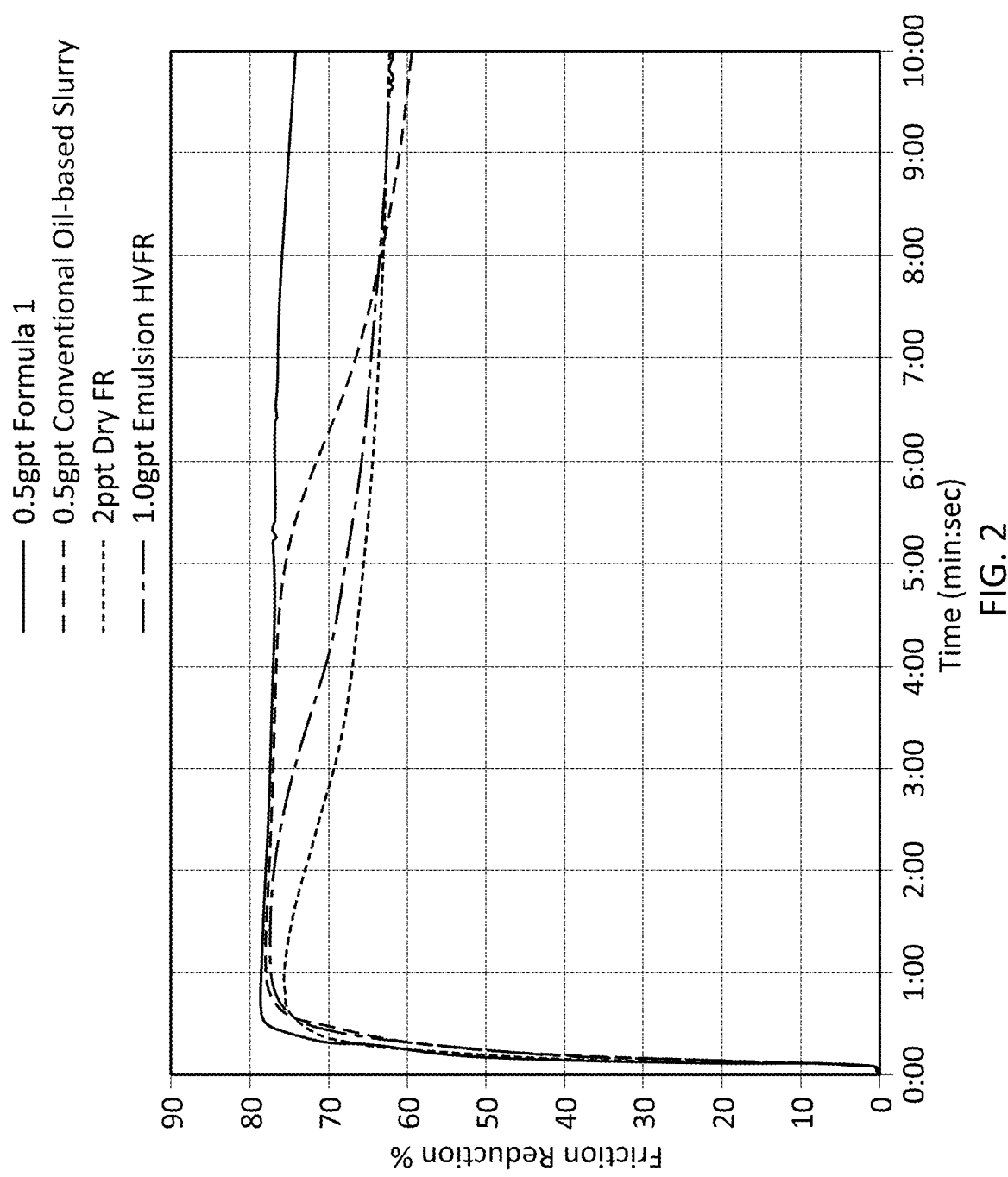
FIG. 2 is a graph depicting a friction reduction comparison as described in Example 5.
Figure 3:
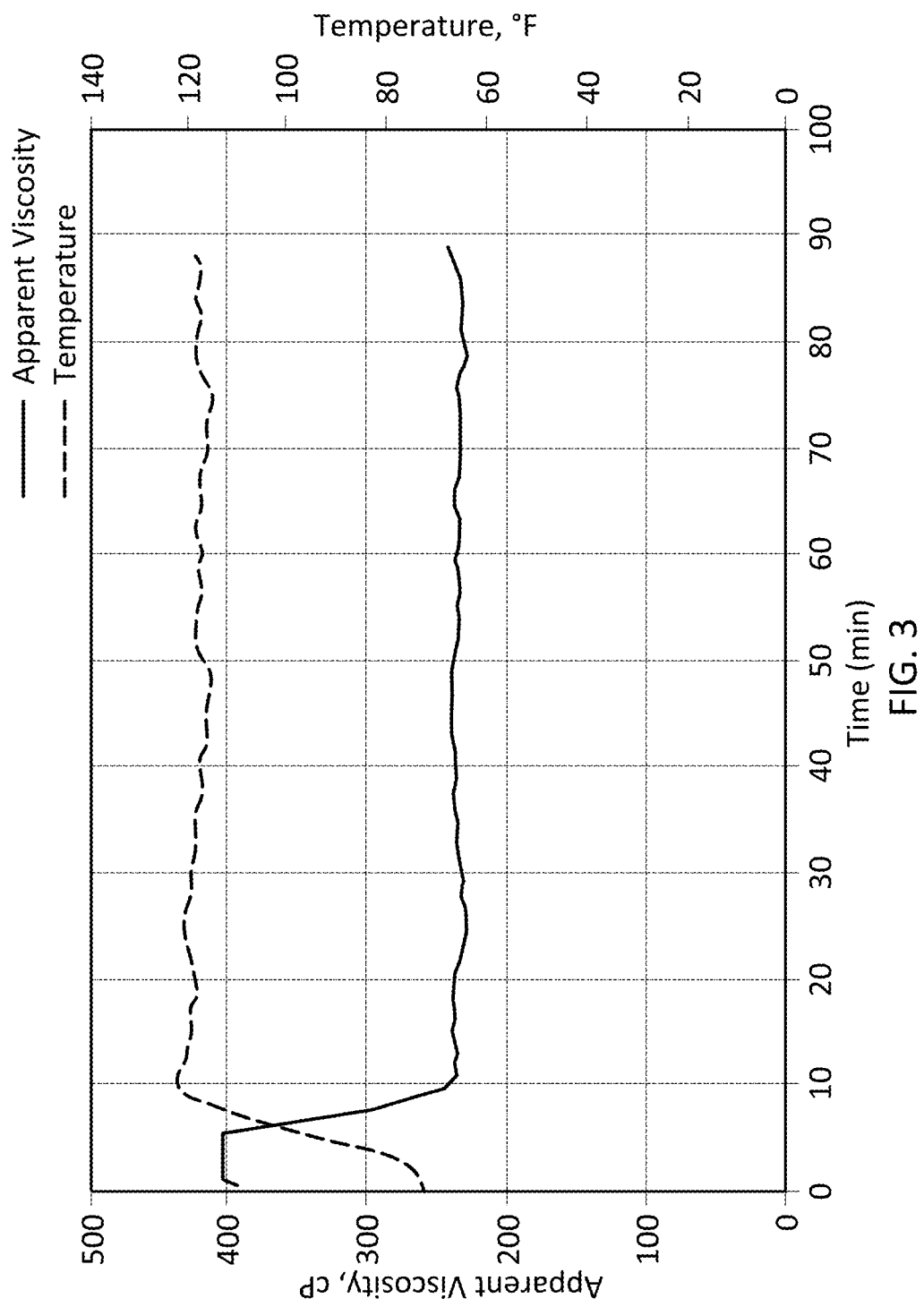
FIG. 3 is a graph depicting shear stability of the oil-based slurry of the present disclosure as described in Example 6.
Figure 4:
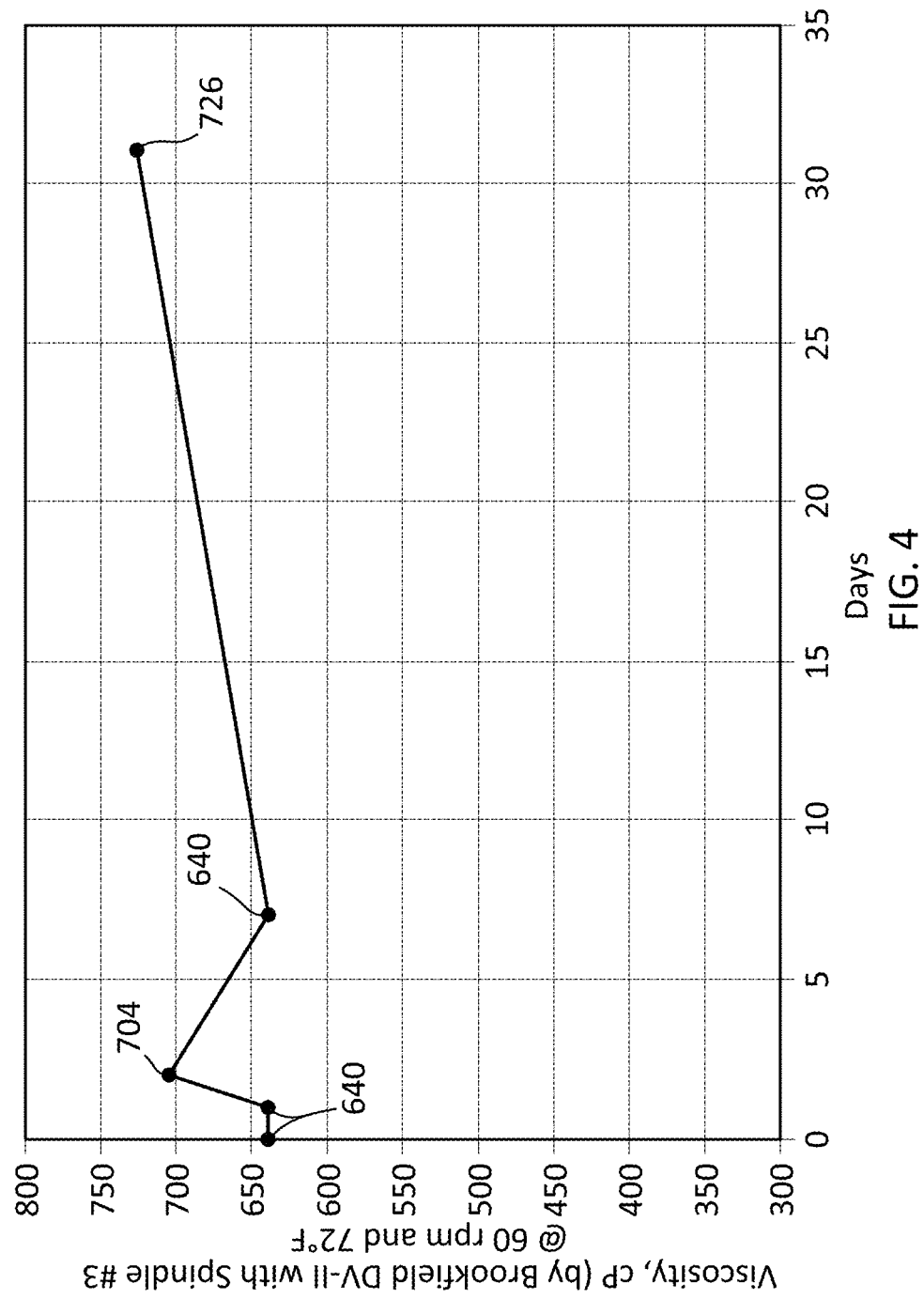
FIG. 4 is a graph depicting bulk viscosity of the oil-based slurry of the present disclosure as described in Example 7.
Figure 5B:
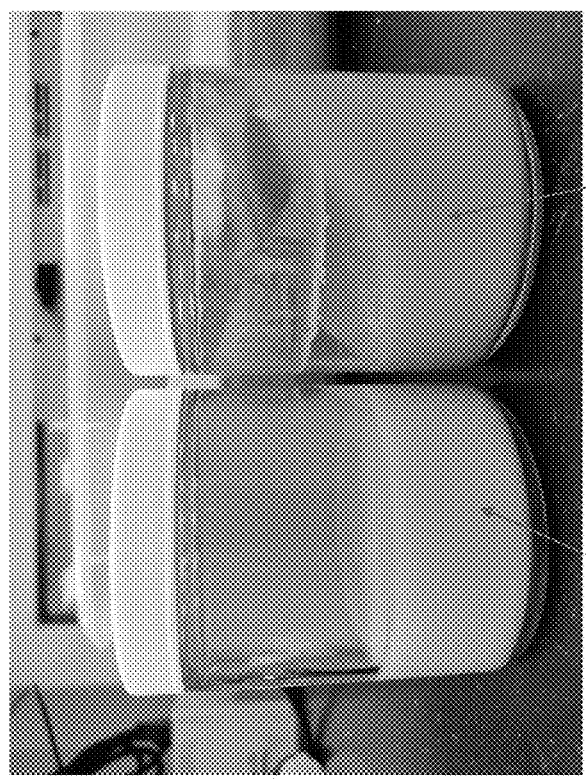
FIGS. 5A-5E are photographs of a comparison product to the oil-based slurry of the present disclosure.
Figure 5A:
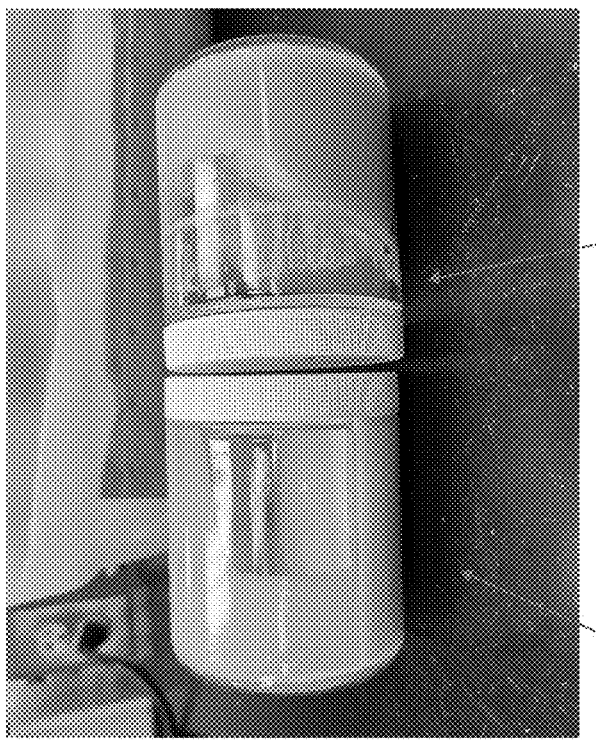
Figure 5:
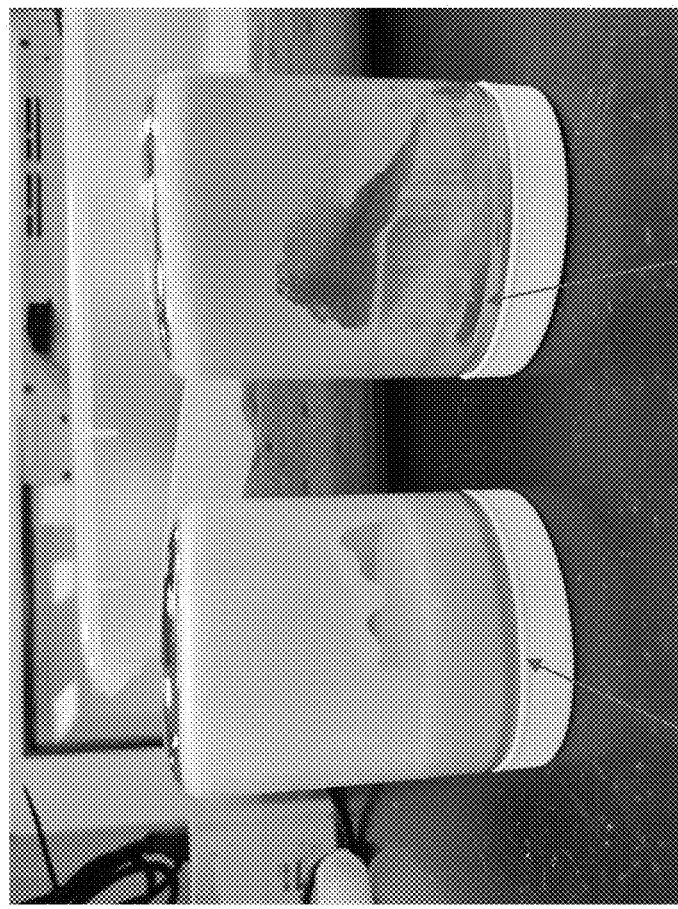
Figure 5E:
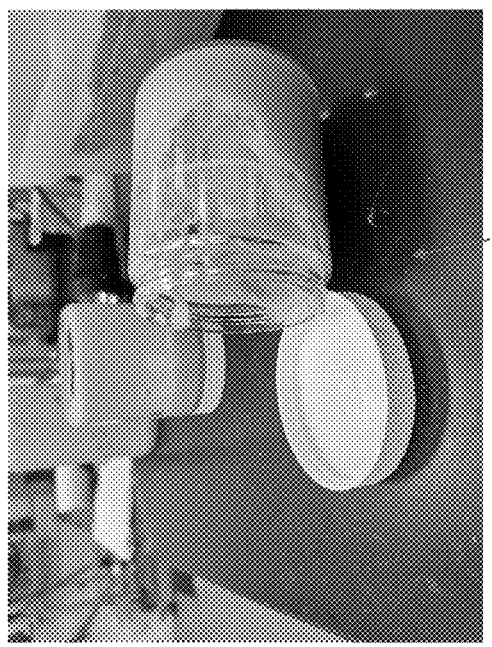
Figure 5D:

Without being bound by theory, it is believed that the use of the dispersant allows higher dry water-soluble polymer suspension in the oil-based slurry than otherwise identical slurries without the dispersant, thereby allowing reduction of the oil in comparison to the dry-water soluble polymer (hereinafter referred to as "increased loading"). Increased loading reduces the total amount of oil necessary in the oil-based slurry, thereby reducing the carbon footprint of the oil-based slurry and reducing logistics and storage costs. As shown in FIG. 2 and described below in Example 5, the oil-based slurries of the present disclosure result in increased hydration speed in source water compared to conventional slurry and emulsion polymer as a result of dry water-soluble polymer particle size distribution and surfactant. As shown in FIGS. 3 and 4, and described in Examples 6 and 7, the addition of the dispersant allows for improved slurry stability, pumpability and humidity/temperature stability compared to conventional slurries. In addition, the oil-based slurries of the present disclosure that include the dispersant allow for use of a wider variety of oil sources than conventional slurries, which are typically limited to petroleum distillates.

EXAMPLES

The disclosure having been generally described, the following examples show particular embodiments of the disclosure. It is understood that the example is given by way of illustration and is not intended to limit the specification or the claims. All compositions percentages given in the examples are by weight.

Example 1

Oil-based slurries in accordance with the present disclosure were formulated as follows:

TABLE 2

| Material | Formula 1 wt % | Formula 2 wt % |
| --- | --- | --- |
| Hydrocarbon | 35-45 | 20-35 |
| Suspension Package | 0.1-2.5 | 0.001-1 |
| Surfactant | 0.01-1 | 0.01-1 |
| Dispersion Agent | 0.01-5 | 0.01-5 |
| Dry Water Soluble Synthetic Polymer | 55-65 | 65-70 |

Example 2

A viscosity comparison was made for oil-based slurries of the present disclosure in comparison to Dry high viscosity friction reducer (HVFR) and Emulsion HVFR in 2% KCl. Viscosity was tested using Grace 3600 viscometer. R1B1 geometry was used. Shear rate was run from 511 s-1 to 10 s-1. The product was tested under ambient temperature 74-75° F.

TABLE 3

| | Hydration Viscosity (cP) of Various Polymer in 2% KCl @ 74-75° F. | | | | | | | | |
| --- | --- | --- | --- | --- | --- | --- | --- | --- | --- |
| Shear Rate (s$^{-1}$) | 2 gpt Formula 1 | 2 gpt Formula 2 | 1 gpt Formula 1 | 1 gpt Formula 2 | 0.5 gpt Formula 1 | 0.5 gpt Formula 2 | 5 ppt Dry HVFR | 10 ppt Dry HVFR | 4 gpt Emulsion HVFR |
| 511.0 | 10.9 | 11.1 | 4.7 | 5.8 | 2.6 | 3.0 | 2.3 | 3.9 | 6.9 |
| 340.0 | 11.8 | 11.4 | 4.7 | 5.6 | 2.4 | 2.9 | 2.1 | 4.1 | 7.2 |
| 170.0 | 11.8 | 11.8 | 4.7 | 5.5 | 2.9 | 2.9 | 2.4 | 4.4 | 8.8 |
| 150.0 | 11.3 | 12.3 | 4.7 | 5.6 | 2.8 | 3.3 | 2.5 | 4.4 | 9.3 |
| 125.0 | 11.8 | 12.0 | 4.8 | 5.1 | 3.0 | 3.2 | 2.4 | 4.0 | 11.2 |
| 100.0 | 12.0 | 13.0 | 5.0 | 5.0 | 3.0 | 3.0 | 2.0 | 5.0 | 11.2 |
| 80.0 | 12.5 | 14.2 | 6.2 | 6.2 | 2.5 | 2.5 | 2.5 | 6.2 | 11.2 |
| 60.0 | 13.0 | 14.7 | 7.7 | 7.3 | 3.3 | 3.3 | 3.3 | 6.7 | 13.3 |
| 50.0 | 13.2 | 15.2 | 7.2 | 8.0 | 4.0 | 2.0 | 4.0 | 6.0 | 14.0 |
| 40.0 | 14.5 | 15.5 | 7.5 | 7.5 | 2.5 | 2.5 | 3.0 | 7.0 | 17.0 |
| 29.9 | 16.7 | 20.1 | 8.0 | 8.7 | 3.3 | 3.3 | 5.4 | 8.0 | 19.3 |
| 20.0 | 19.0 | 23.0 | 7.0 | 7.0 | 1.0 | 1.0 | 3.0 | 8.0 | 12.0 |
| 10.0 | 34.0 | 40.0 | 18.0 | 24.0 | 6.0 | 6.0 | 12.0 | 16.0 | 14.0 |

Example 3

A viscosity comparison was made for oil-based slurries of the present disclosure in comparison to Dry HVFR and Emulsion HVFR in Permian Brackish Water. Viscosity was tested using Grace 3600 viscometer. R1B1 geometry was used. Shear rate was run from 511 s-1 to 10 s-1. The product was tested under ambient temperature 74-75° F.

TABLE 4

Hydration Viscosity (cP) of Various Polymer in Permian Brackish Water @ 74-75° F.

| Shear Rate ($s^{-1}$) | 2 gpt Formula 1 | 2 gpt Formula 2 | 1 gpt Formula 1 | 1 gpt Formula 2 | 0.5 Formula 1 | 0.5 gpt Formula 2 | 5 ppt Dry HVFR | 10 ppt Dry HVFR | 4 gpt Emulsion HVFR |
|---|---|---|---|---|---|---|---|---|---|
| 511.0 | 9.4 | 11.5 | 5.0 | 5.3 | 2.5 | 3.2 | 2.5 | 4.3 | 6.5 |
| 340.0 | 10.4 | 12.1 | 4.9 | 5.8 | 2.2 | 3.5 | 2.4 | 4.2 | 6.8 |
| 170.0 | 11.4 | 12.5 | 5.3 | 5.9 | 2.9 | 3.6 | 2.9 | 4.7 | 7.3 |
| 150.0 | 10.7 | 12.4 | 5.6 | 5.6 | 2.8 | 3.6 | 3.3 | 4.7 | 7.3 |
| 125.0 | 11.2 | 12.0 | 5.0 | 5.6 | 3.4 | 4.0 | 3.2 | 4.8 | 6.9 |
| 100.0 | 11.4 | 13.0 | 5.2 | 6.0 | 3.4 | 5.0 | 3.0 | 5.0 | 7.0 |
| 80.0 | 12.5 | 15.0 | 6.2 | 9.2 | 2.7 | 6.0 | 3.7 | 6.2 | 7.5 |
| 60.0 | 11.7 | 16.7 | 6.7 | 8.3 | 2.7 | 6.0 | 3.3 | 6.7 | 8.0 |
| 50.0 | 14.0 | 16.8 | 6.0 | 10.4 | 2.0 | 5.6 | 4.0 | 8.0 | 8.0 |
| 40.0 | 15.0 | 20.0 | 7.5 | 10.5 | 4.0 | 7.0 | 5.0 | 9.5 | 8.5 |
| 29.9 | 16.7 | 23.4 | 10.0 | 10.0 | 5.4 | 4.0 | 3.3 | 10.0 | 10.0 |
| 20.0 | 19.0 | 26.0 | 5.0 | 8.0 | 11.0 | 1.0 | 2.0 | 7.0 | 4.0 |
| 10.0 | 44.0 | 50.0 | 16.0 | 20.0 | 34.0 | 10.0 | 14.0 | 20.0 | 4.0 |

Example 4

The three polymer products (1 gpt Formula 1, 1 gpt Formula 2 and 4 gpt Emulsion HVFR) were hydrated in Permian Brackish Water @ 1500 rpm for 3 min, then each fluid was tested under shear ramp. The shear started at 5 s-1 and increased step wise and maximized at 1012 s-1. Then shear was ramped down to 5 s-1 stepwise for a total of four cycles. The characteristics of the Permian Brackish Water are shown in Table 5:

TABLE 5

| | |
|---|---|
| Na: 3,094 ppm | Cl: 3,626.7 ppm |
| Ca: 120 ppm | SO4: 2396.5 ppm |
| Mg: 63.6 ppm | HCO3: 793 ppm |
| Sr: 5.6 ppm | CO3: 60 ppm |
| K: 2.3 ppm | |
| Fe: 1.0 ppm | |

As shown in FIG. 1, Both Formula 1 and Formula 2 fluids exhibited repeatable shear thinning effect under shear ramp, but Emulsion HVFR displayed shear thickening effect throughout the entire test indicating ultra high activity are more shear stable even at much lower dosage rate Example 5

A friction reduction comparison was made for an oil-based slurry of the present disclosure, conventional oil-based slurry, dry FR, and Emulsion HVFR in 50K complex synthetic brine. A Chandler flow loop with 30 feet total loop size, and 10 ft testing section with differential pressure transducer was used. The testing tube inner diameter was 0.4 inch, the flow rate was 10 gal/min, and Reynolds's number was 89,000. Water composition was:

Na: 16,738 ppm Cl: 30,562 ppm, Ca: 2,700 ppm.

As shown in FIG. 2, the oil-based slurry of the present disclosure showed superior flow loop performance with faster hydration speed, higher maximum friction reduction and longer performance stability compared to the other fluids tested.

Example 6

The oil-based slurry of the present disclosure was tested in Grace 3600 under constant shear @ 511 s-1 and constant temperature @ 120° F. The oil-based slurry of the present disclosure exhibited heat thinning and stable bulk viscosity when temperature and shear reached a constant value, as shown in FIG. 3.

Example 7

The oil-based slurry of the present disclosure was tested under ambient temperature and humidity conditions without environmental control (no temperature and humidity control). The temperature and humidity cycles were:
Temperature range: 80-95° F.,
Humidity: 60-88%.

As shown in FIG. 4, the bulk viscosity of the oil-based slurry of the present disclosure was measured in Brookfield DV-II using spindle #3 and 60 RPM and 72° F. at various times after exposure to temperature and humidity cycles. The oil-based slurry of the present disclosure showed very stable bulk product viscosity under temperature and humidity cycles indicating a good handling and operating capability for the oil-based slurry of the present disclosure.

Example 8

The oil-based slurry of the present disclosure was formulated as follows:

TABLE 6

| Material | Formula 1 wt % |
|---|---|
| Hydrocarbon | 35-45 |
| Suspension Package | 0.1-2.5 |
| Surfactant | 0.01-1 |
| Dispersion Agent | 0.01-5 |
| Dry Water Soluble Synthetic Polymer | 55-65 |

A polyacrylamide slurry in accordance with US 2017/0313930 was formulated as follows:

TABLE 7

| Material | Polyacrylamide Slurry Formula wt % |
|---|---|
| Petroleum Distillate | 45 |
| Suspension Aid | 1 |

TABLE 7-continued

| Material | Polyacrylamide Slurry Formula wt % |
|---|---|
| Surfactant | 1 |
| Dry Polyacrylamide, 75 mesh | 53 |

The product of Formula 1 is fully pourable with the product viscosity at 726 cp after 30 days sitting under ambient condition. The viscosity was measured by Brookfield DV-II viscometer using spindle #3 @ 60 RPM and 72° F. By contrast, the polyacrylamide slurry product solidified after sitting overnight under ambient temperature. The polyacrylamide product is not pourable and product viscosity is not measurable, as shown in the comparison photos in FIGS. 5A-5E.

Depending on the context, all references herein to the "disclosure" may in some cases refer to certain specific embodiments only. In other cases it may refer to subject matter recited in one or more, but not necessarily all, of the claims. While the foregoing is directed to embodiments, versions and examples of the present disclosure, which are included to enable a person of ordinary skill in the art to make and use the disclosures when the information in this patent is combined with available information and technology, the disclosures are not limited to only these particular embodiments, versions and examples. Other and further embodiments, versions and examples of the disclosure may be devised without departing from the basic scope thereof and the scope thereof is determined by the claims that follow.

What is claimed is:

1. An oil-based slurry comprising:
   oil, wherein the oil is a petroleum distillate;
   a suspension package, wherein the suspension package is a linear styrenic block copolymer;
   a dispersion agent, wherein the dispersion agent is poly (acrylic acid-co-methacryloxethyltrimethyl ammonium chloride-co-isopentenol polyoxyethylene ether);
   a surfactant, wherein the surfactant is a combination of alcohol ethoxylates and sorbitan ester ethoxylates, and
   a dry water-soluble polymer, wherein the dry water soluble synthetic polymer is a polyacrylamide-acrylate-acrylamido-2-methylpropane sulfonic acid terpolyme;
   wherein the oil-based slurry comprises between 20% and 35% oil by weight of the oil based slurry and wherein the oil-based slurry comprises between 0.1% and 1% of the surfactant by weight of the oil-based slurry.

2. The oil-based slurry of claim 1, wherein the oil-based slurry comprises between 0.10% and 5% of the dispersion agent by weight of the oil-based slurry.

3. The oil-based slurry of claim 1, wherein the oil-based slurry comprises between 55% and 70% of the dry water-soluble polymer.

4. A slickwater fluid comprising the oil-based slurry of claim 1.

* * * * *